United States Patent

Miller et al.

[11] Patent Number: 5,130,848
[45] Date of Patent: Jul. 14, 1992

[54] PASSIVE RAILROAD CROSSING WARNING SYSTEM

[75] Inventors: Richard A. Miller, Stillwater; Scott G. Theirl, St. Paul; Kenneth A. Aho, Chisago, all of Minn.

[73] Assignee: Minnesota Mining and Manufacturing Company, Saint Paul, Minn.

[21] Appl. No.: 660,788

[22] Filed: Feb. 26, 1991

[51] Int. Cl.⁵ ............................ G02B 5/04; E01F 9/00
[52] U.S. Cl. ............................................. 359/552; 359/547; 404/9
[58] Field of Search ............... 359/515, 527–532, 359/542, 546–547, 551–552, 618, 639, 640, 833, 834, 837, 885, 894; 246/477; 404/9

[56] References Cited

U.S. PATENT DOCUMENTS

| | | | |
|---|---|---|---|
| 3,814,500 | 6/1974 | Ebenbichler | 359/514 |
| 4,252,409 | 2/1981 | Schwab | 359/527 |
| 4,776,671 | 10/1988 | Sumi et al. | 359/885 |

*Primary Examiner*—Paul M. Dzierzynski
*Assistant Examiner*—James Phan
*Attorney, Agent, or Firm*—Gary L. Griswold; Walter N. Kirn; Stephen W. Buckingham

[57] ABSTRACT

A passive railroad crossing warning device has two input optical windows that receive light from the headlight of an oncoming locomotive. The light is redirected to an output optical window where a combiner causes it to exit at a predetermined angle to make it visible to motorists approaching the railroad crossing.

10 Claims, 2 Drawing Sheets

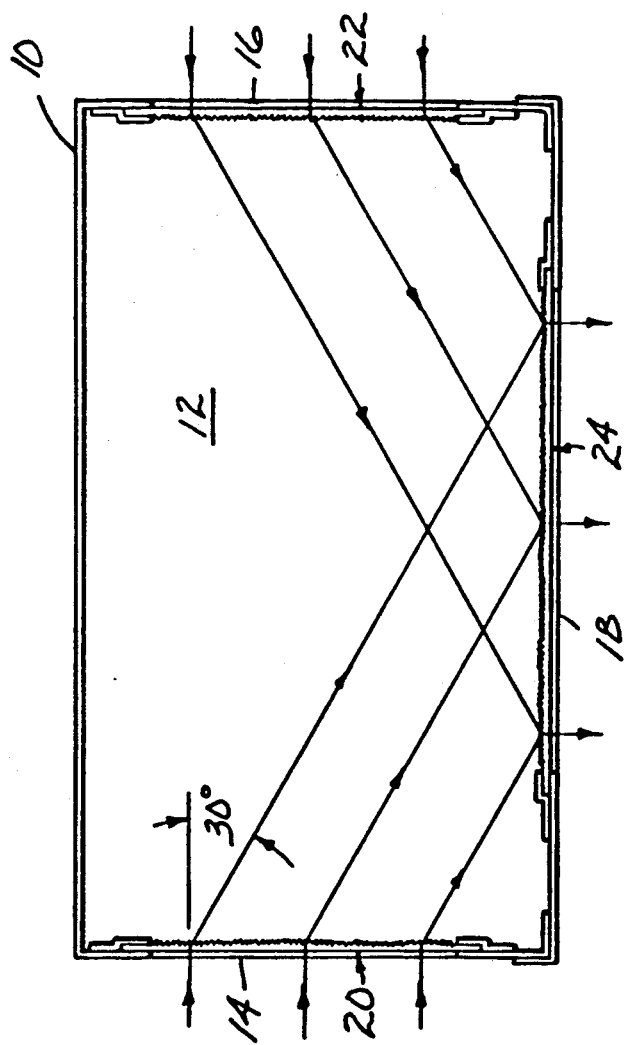
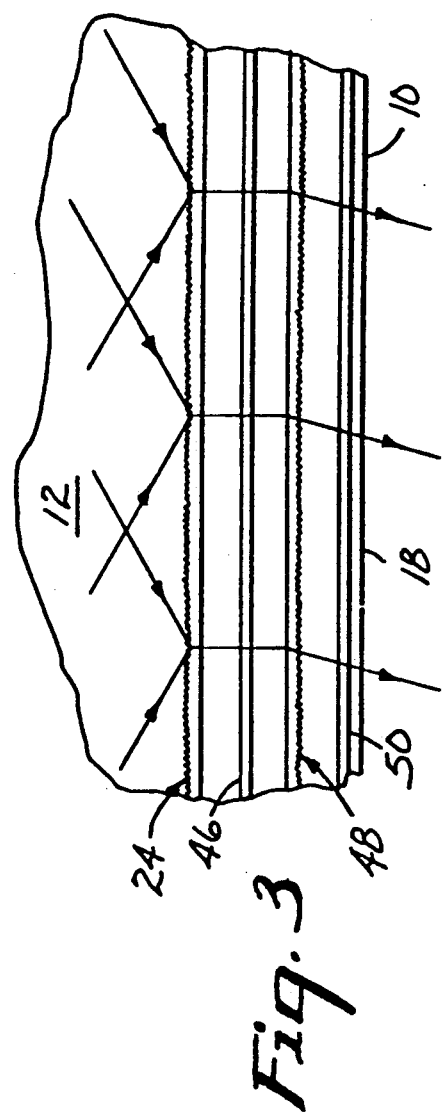

PASSIVE RAILROAD CROSSING WARNING SYSTEM

BACKGROUND OF THE INVENTION

Accidents involving motor vehicles and railroad trains are a serious problem. In the United States alone over 5,000 such accident occur annually. For example, a report issued by the United States Department of Transportation in April, 1989 indicated that during 1987 5,859 such accidents occurred at public rail crossings. Those accidents resulted in 2,313 injuries and 598 fatalities.

Approximately half of these accidents occurred at crossings that lacked warning signals. Furthermore, only about 31 percent of the crossings in the United States have such signals. It is generally believed that an increase in the number of such signals would decrease the incidence of such accidents. This is particularly true in the case of rural crossings where, due to the lack of street lights, the visibility is reduced. Unfortunately, the cost of installing such warning signals would be prohibitive, especially at rural crossings, which, in many instances do not have electric power easily available. Given the higher cost of installing electrical systems at many rural crossings as well as the low traffic levels at such crossings, it is likely that many of such crossings will not have active warning devices in the near future.

SUMMARY OF THE INVENTION

According to the invention a housing defines two input optical windows on opposing sides and an output optical window on a third side. Each input optical window has a light redirecting device associated therewith. The light redirecting devices redirect light entering through the input optical windows to the output optical window where a combiner causes the light to exit at a predetermined angle with respect to the output optical window.

BRIEF DESCRIPTION OF THE DRAWINGS

FIG. 1 is a drawing of a passive railroad crossing warning device according to the invention;

FIG. 3 is a schematic diagram of an output window of a warning device according to the invention.

DETAILED DESCRIPTION OF A PREFERRED EMBODIMENT

Figure 2:
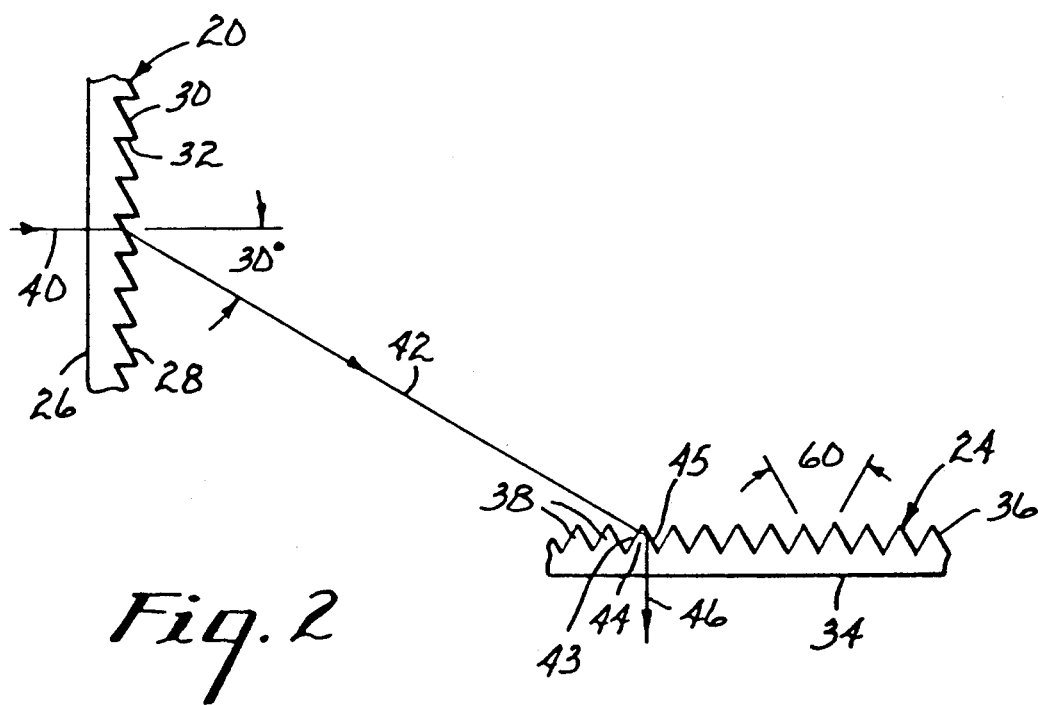
FIG. 2 is a schematic diagram illustrating the cooperation between the light redirecting device of the input window and the combiner.

In the present invention a passive railroad warning signal collects light from the headlight of an on-coming locomotive and redirects it such that it will be visible to a motorist approaching a crossing.

FIG. 1 shows a preferred embodiment of the invention. In FIG. 1 a housing, 10, defines an optical cavity, 12. Optical cavity 12 has input optical windows 14 and 16 on opposing sides of housing 10 for admitting light into optical cavity 12. Optical cavity 12 further has an output optical window, 18, on a third side of housing 10 for allowing light to escape from optical cavity 12. Lying in optical windows 14 and 16 are light redirecting members 20 and 22, respectively. Light redirecting members 20 and 22 deviate the light passing therethrough such that light entering through windows 14 and 16 will be directed to output optical window 18. The amount of deviation provided by light redirecting members 20 and 22 may be varied without departing from the invention. In the embodiment shown the light is deviated by 30 degrees. By simple trigonometry it may be seen that, if input optical windows 14 and 16 remain constant in size and the angle of deviation caused by light redirecting members 20 and 22 is increased, the size of the output beam of light will be reduced but the apparent brightness will increase.

Output optical window 18 has lying therein a combiner 24. Combiner 24 is not usually used to combine beams from optical windows 14 and 16 because it would be rare that trains would be approaching the same railroad crossing from both directions at the same time, although it would be capable of doing so. However, it functions as a combiner in the sense that it must be able to accept light from either input optical window and redirect it in the desired output direction, typically perpendicular to the plane of output optical window 18.

FIG. 2 schematically illustrates the interaction between light redirecting member 20 and combiner 24. Light redirecting member 22 interacts with combiner 24 in an analogous manner. Light deviating member 20 has a smooth surface 26 and a structured surface 28. Structured surface 28 has a series of triangular prisms formed thereon. These prisms are linear prisms having axes that would run vertically when the passive railroad warning system of the invention is in normal use. Each of the prisms has an active surface such as active surface 30 and a riser such as riser 32. Combiner 24 has a smooth surface 34 and a structured surface 36. Structured surface 36 has formed thereon triangular prisms such as prism 38. Either of the surfaces of prism 38 could be an active surface depending on the direction from which light approaches combiner 24. In the embodiment shown in FIG. 2, each of the prisms on structured surface 36 is a linear prism that has an axis that runs vertically when the passive railroad warning system of the invention is in normal use.

In use a light ray 40 enters the passive railroad warning device of the invention through smooth surface 26 of light redirecting member 20. It passes through light redirecting member 20 and is refracted as it exits through structured surface 28. As stated previously, in the embodiment shown, the light is deviated through an angle of 30 degrees. Other angles could be used, however. The angle through which the light is deviated will be determined by the angle between the active surfaces such as active surface 30 and smooth surface 26 and the index of refraction of the material of which light redirecting member 20 is made. Emerging from light redirecting member 20 inside optical cavity 12 is refracted beam 42. Refracted beam 42 then enters combiner 24 through surface 43 of prism 44. It then strikes surface 45 of prism 44 from which it is totally internally reflected. It then emerges through smooth surface 34 of combiner 24 as emerging beam 46. Since, in this embodiment, the combiner works solely on the principle of total internal reflection, the angle through which the light is deviated will not depend on the index of refraction of combiner 24. In the embodiment shown, the prisms of structured surface 36 of combiner 24 are equilateral prisms. This is because it is necessary to deviate the light by an additional 60 degrees in order to have it emerge perpendicular to the plane of output window 18. If the light were deviated by an angle other than 30 degrees by light redirecting member 20, prisms having different included angles would be required on structured surface 36 of combiner 24. Furthermore, due to the particular angles chosen, light ray 42 strikes surface 43 perpendicular thereto and is not refracted. If that were not true, combiner 24 would have to be designed to compensate for such refraction.

FIG. 3 shows an enlarged version of the materials lying in output window 18. The first item encountered by light exiting from the passive railroad warning device of the invention is combiner 24. This causes the light to be deviated to a direction that is perpendicular to the plane of output window 18. Optical element 46 is provided if it is desired for the output light to have a particular beam shape. For example, optical element 46 could include conventional pillow lenses to provide a required amount of beam spread. Furthermore, optical element 46 is a possible location to provide a colored filter if it is desired that the output beam have a particular color, for example, red. Alternatively such a colored filter could be provided in the input window. Light redirecting member 48 operates much like the light redirecting members 20 and 22. The reason for including light redirecting member 48 is that railroad tracks and roads often do not intersect perpendicular to one another. Therefore light exiting from the passive railroad warning device of the invention in a direction perpendicular to the output window will not necessarily be clearly visible to motorists approaching the railroad tracks. Furthermore, even if the tracks and the road are perpendicular to one another, the fact that the passive warning device of the invention would normally be positioned along the side of the road, may still prevent it from being clearly visible to approaching motorists. Therefore light redirecting member 48 is selected specifically for a particular railroad crossing to deviate the light so that it will be directed in a direction that will make it clearly visible to motorists. Finally, a protective cover 50 is provided in order to provide protection to combiner 24, optical element 46 and light deviating member 48.

All of the optical elements of the present invention may be of any transparent material, although polymeric materials are generally preferred. In particular, acrylics and polycarbonate are preferred. In most environments resistance to impact is a major design factor, making polycarbonate particularly desirable.

What is claimed is:

1. A passive railroad crossing warning device comprising:

a housing defining an optical cavity having first and second input optical windows on opposing sides of said housing and an output optical window;

first and second light redirecting means for deviating light entering said input optical windows to said output optical window, said first and second light redirecting means being associated with said first and second input optical windows, respectively; and combining means associated with said output optical window for causing light reaching said output optical window from said input optical windows to exit said optical cavity at a first predetermined angle to said output optical window.

2. The passive railroad crossing warning device for claim 1 wherein said first predetermined angle is perpendicular.

3. The passive railroad crossing warning device of claim 2 further comprising a third light redirecting means for deviating light from said first predetermined angle to a second predetermined angle to said output optical window.

4. The passive railroad crossing warning device of claim 1 wherein each of said light redirecting means comprises a thin optical element having a smooth surface and a structured surface, each of said structured surfaces having a plurality of linear prisms thereon.

5. The passive railroad crossing warning device of claim 1 wherein said combining means comprises a thin optical element having a smooth surface and a structured surface, said structured surface having a plurality of linear prisms thereon.

6. The passive railroad crossing warning device for claim 5 wherein said first predetermined angle is perpendicular.

7. The passive railroad crossing warning device of claim 6 further comprising a third light redirecting means for deviating light from said first predetermined angle to a second predetermined angle to said output optical window.

8. The passive railroad crossing warning device of claim 1 further comprising a filter of a predetermined color so that light exiting said passive railroad crossing warning device will be of said predetermined color.

9. The passive railroad crossing warning device for claim 8 wherein said said first predetermined angle is perpendicular.

10. The passive railroad crossing warning device of claim 9 further comprising a third light redirecting means for deviating light from said first predetermined angle to a second predetermined angle to said output optical window.

* * * * *

UNITED STATES PATENT AND TRADEMARK OFFICE
CERTIFICATE OF CORRECTION

PATENT NO. : 5,130,848

DATED : July 14, 1992

INVENTOR(S) : Miller et al.

It is certified that error appears in the above-identified patent and that said Letters Patent is hereby corrected as shown below:

On the Title page, item [19], "Miller et al." should read -- Dreyer, Jr. et al.--.

Section [75], "Richard A. Miller, Stillwater; Scott G. Theirl, St. Paul; Kenneth A. Aho, Chisago, all of Minn." should read -- John F. Dreyer, Jr., North Oaks; Richard A. Miller, Stillwater; Scott G. Theirl, St. Paul; Kenneth A. Aho, Chisago, all of Minn. --.

Column 1, line 8, "accident" should read -- accidents --.

Column 4, line 46, "said," second occurrence, should be deleted.

Signed and Sealed this

Twenty-first Day of September, 1993

Attest:

BRUCE LEHMAN

*Attesting Officer*     *Commissioner of Patents and Trademarks*